Patented Sept. 17, 1935

2,014,370

UNITED STATES PATENT OFFICE 2,014,370

PRODUCT OF CASHEW NUT SHELL LIQUID AND RESIN AND PROCESS THEREFOR

Frederick M. Damitz, Irvington, N. J., assignor, by mesne assignments, to The Harvel Corporation, a corporation of New Jersey No Drawing. Application September 27, 1932, Serial No. 635,130

3 Claims. (Cl. 260—2)

The present invention relates to reaction products of cashew nut shell liquid and materials of the nature of gums and resins, and the present invention also relates to methods and steps for making and using the products of the invention.

An object of the present invention is to produce a resin which can be used as a varnish gum, which can be used as an impregnating compound, or for melting on laminating sheets of paper or fabric or other materials for making coils, tubes, etc., which can be used for making molded compositions, and which is adapted for use generally in the coating, impregnating, electric insulating and other arts.

Other objects and advantages will be apparent from the following description in which the invention is fully set forth generally and also by particular example, and the present invention consists in the methods, processes and steps, products and materials herein set forth and claimed; it being understood that various changes may be made within the scope of the appended claims without departing from the spirit of the invention.

The present invention is an improvement in the art set forth in patents to Harvey No. 1,725,-791 and 1,725,796 and patent to Ryan No. 1,838,-072. According to the present invention I react cashew nut shell liquid and materials of the nature of gums and resins to produce a product which when cold is resinous, fusible, brittle with a conchoidal fraction and which is soluble in cashew nut shell liquid. By further reaction with setting materials or driers the product of the invention is made to be insoluble in cashew nut shell liquid and in the common solvents and resistant to the action of acids and alkalies. According to the present invention cashew nut shell liquid is heated to about 600° F. with materials such as fossil gums, run fossil gums, ester gums, rosin and so on until it is at a state in which a cool button of it is brittle and can be pulverized between the thumb and finger. This product of the invention is suitable for use generally in compounding varnishes, paint vehicals, impregnating compounds, molded compositions and so on and can be used alone or with other materials such as drying oils, gums, resins, pitches and waxes.

The products of the invention can be used directly, without cooling, in the compounding of various materials, in which case the preparation thereof will be a step in a further continuing process. In another case resin of the invention is allowed to cool to the solid state after which it can be broken up and remelted for whatever use is desired.

Particular examples are given below to illustrate the invention but these are not to be taken to limit the scope of the invention.

As an example of a resin suitable for use in an air drying varnish the following is given: Seventy-five parts by weight of cashew nut shell liquid and twenty-five parts of run kauri gum are heated together at 600° F. to get a button which will pulverize between the fingers. Hereinafter this resin will be designated as "Resin A".

An example of an air drying varnish using resin A, of the above paragraph is as follows: The heating of the resin is continued at about 600° F. and when the brittle condition in a button is reached, about forty parts by weight of heavy linseed oil are added and the temperature brought back again to 600° F. after which three-quarters of one part by weight of litharge and one hundred parts of China-wood oil are added and the temperature brought back to 570° F. After this about twenty-five parts by weight of China-wood oil are added to bring the temperature down, and the batch is allowed to cool to about 450° F. at which point about one and one-quarter parts of cobalt acetate are added and then the temperature held at about 425° F. for about one-half hour, after which the batch is cooled and thinned with about four hundred parts by weight of thinner such as varnoline or naphtha. This gives a varnish which will dry in the air in about 3 hours. The cashew nut shell liquid-kauri resin can of course be cooled and remelted as desired in making up the varnish given in the above example or in any other varnish or composition. The time of heating at about 425° F. immediately after adding the cobalt acetate can be varied to suit the time of drying desired in the finished varnish and also to vary the flexibility, and hardness and other characteristics thereof to suit the use for which it is desired.

The proportions of cashew nut shell liquid and kauri can be varied from those given in Example A, and the range of cashew nut shell liquid to kauri or other fossil gum, natural or run, or of resins, gums, waxes, asphalts or pitches or mixture of any two or more of these can be varied from about eighty parts by weight of cashew nut shell liquid to twenty parts of one or more of the others to about twenty parts of cashew nut shell liquid to eighty parts of the other material.

Resin A can be powdered and used by itself as an impregnating compound and also for sprinkling between sheets or layers of paper or cloth in the formation of laminated sheets or tubing, heat being used for melting the resin A into the laminations. The other resins which can be made with cashew nut shell liquid and the other materials above mentioned can be used in the same manner.

These resins and other products made according to the present invention are oil, acid, alkali, moisture and salt water proof.

The resins of the present invention, resin A for example, can be blended with asphalts, asphaltites and pitches to make black air drying varnishes with extreme oil proofness, an example of which is as follows: eighty parts by weight of resin; sixty parts of asphalt, asphaltite or pitch, e. g., manjak; fifty parts of linseed oil; two hundred and fifty parts of China-wood oil; three and one-half parts each of litharge and cobalt acetate and eight hundred parts of thinner such as varnoline or naphtha. The resin A, asphalt (manjak) and linseed oil are heated up to about 600° F. and held there for about one-half to one hour for body when the litharge followed by about half of the China-wood oil is added and the temperature brought back to about 570° F. The batch is then chilled back with the rest of the China-wood oil. The cobalt acetate is added at about 450° F. and the varnish held at this temperature for body after which it is cooled and the thinner added.

The resins of the invention, resin A for example, are useful in making varnishes which are both flexible and resistant to material such as oil, acids, alkalies and moisture.

When a resin of the present invention is used for making laminated sheets, tubes, and the like it can be used as it is or it can be used with a setting material for rendering it infusible. In the latter case an example is to mix about two to five percent of paraformaldehyde or litharge with powdered resin A, heat being used to fuse the resin in place and to effect setting reaction. This mixture is useful also, with or without modifiers and fillers, for making molded articles.

Having thus described my invention what I claim and desire to protect by Letters Patent is—

1. The method which comprises heating cashew nut shell liquid and materials selected from the group consisting of fossil gums, ester gums, run fossil gums, at about 600° F. until a product is produced which when cold is resinous, brittle and fusible.

2. The method which comprises heating together cashew nut shell liquid and a resin fusible therewith to about 600° F. until a product is obtained which when cold is resinous, brittle and fusible.

3. A fusible material which is hard and resinous when cold and is adapted for blending with paint and varnish materials to obtain an air drying, infusible and oil resistant film which said fusible material is a heat reaction product of cashew nut shell liquid and run copals to about 600° F.

FREDERICK M. DAMITZ.